United States Patent [19]

Paterson et al.

[11] Patent Number: 5,027,699
[45] Date of Patent: Jul. 2, 1991

[54] PEELING HEAD

[75] Inventors: Douglas F. Paterson, Pueblo; Gary L. Dare, Colorado Springs, both of Colo.; Konrad Meissner, Lafayette, Calif.

[73] Assignee: Atlas Pacific Engineering Company, Pueblo, Colo.

[21] Appl. No.: 569,837

[22] Filed: Aug. 20, 1990

[51] Int. Cl.⁵ .............................................. A23N 7/00
[52] U.S. Cl. ........................................ 99/593; 99/594
[58] Field of Search ................. 99/491, 540, 541, 574, 99/584, 590–599

[56] References Cited

U.S. PATENT DOCUMENTS

| | | | |
|---|---|---|---|
| 1,872,731 | 8/1932 | Goranson et al. | 99/593 |
| 3,058,149 | 10/1962 | Schmid et al. | 99/593 |
| 3,058,502 | 10/1962 | Loveland et al. | 99/593 |
| 3,067,791 | 12/1962 | Boyce | 99/593 |
| 3,680,614 | 8/1972 | Polk, Jr. | 99/594 |
| 4,176,594 | 12/1979 | Amstad | 99/593 |
| 4,430,932 | 2/1984 | Tichy et al. | 99/594 |
| 4,771,682 | 9/1988 | Ishikawa | 99/590 |

Primary Examiner—Timothy F. Simone
Attorney, Agent, or Firm—James F. Mitchell

[57] ABSTRACT

A lightweight peeling head is provided in which a plastic guard body cooperates with a rotary peeling cutter for determining the depth of cut made by the cutter wherein a ceramic wear resistant tracing shoe insert is formed in the plastic guard body. The ceramic tracing shoe rides against the surface of the fruit, for example apples, as the fruit is being peeled. A chip breaker is provided having a pair of teeth wherein each tooth has a positive rake relative to the direction of travel of the peel string and wherein each tooth has a positive attack angle whereby the peel string is driven towards the base of the teeth as the peel string is being cut by said tooth.

13 Claims, 3 Drawing Sheets

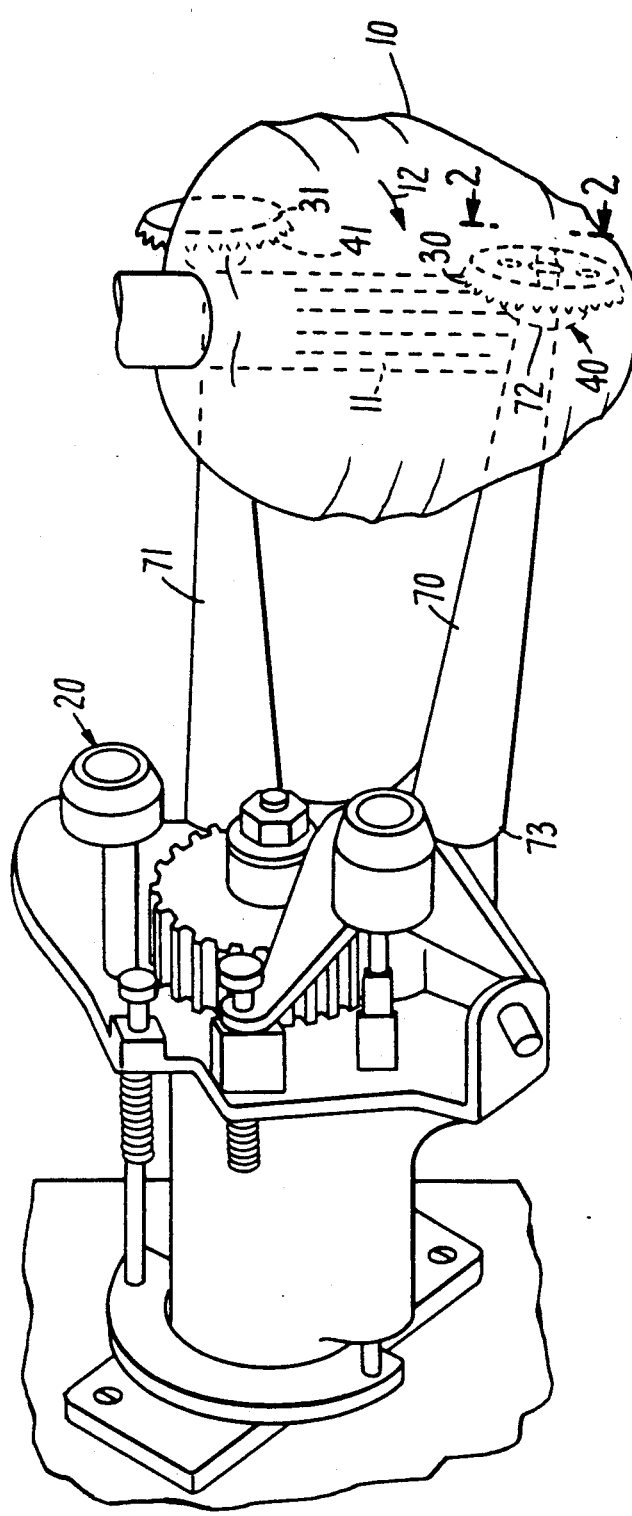

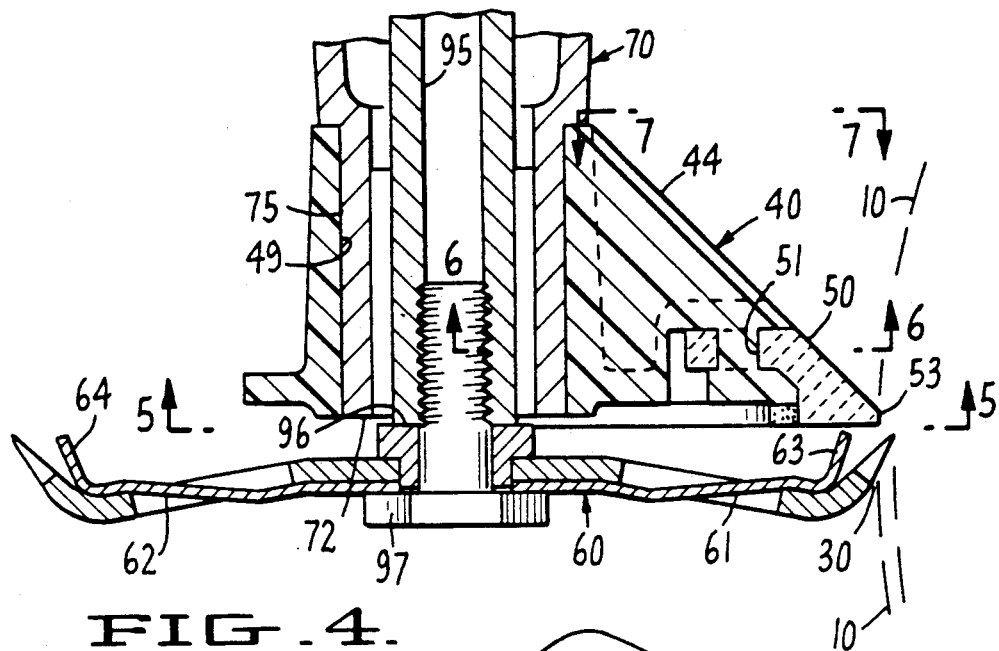
FIG. 4.
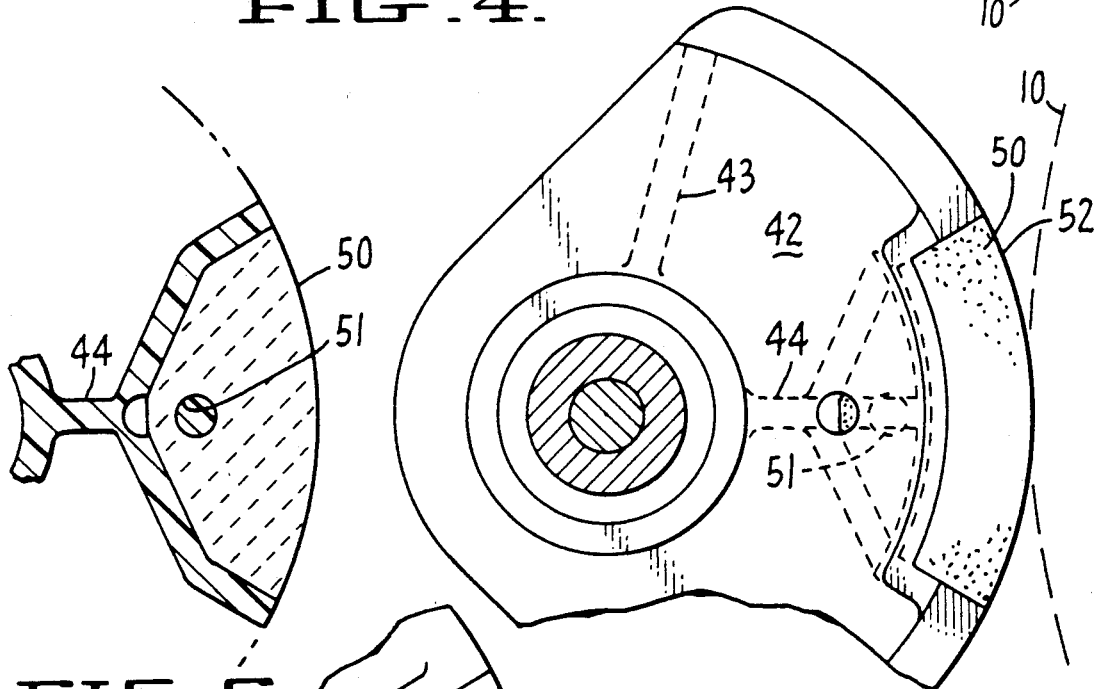
FIG. 6.
FIG. 5.
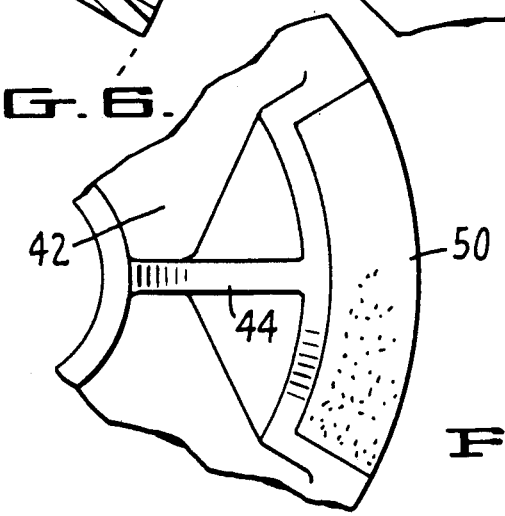
FIG. 7.

PEELING HEAD

SUMMARY OF THE INVENTION

This invention relates in general to a peeling head for continuously peeling fruit such as apples, and more particularly to an improved peeling head over that shown in U.S. Pat. No. 4,430,932, owned by the assignee of this invention and this application.

This invention provides a peeler head in which a rotary peeling cutter is mounted at the end of an elongated drive housing. More specifically, the present invention provides a peeling head mechanism which is considerably lighter in weight and which has a considerably smaller moment of inertia as compared with peeling mechanisms of the prior art.

More particularly, this invention utilizes a light weight plastic guard which in turn has a ceramic tracing shoe formed therein, whereby during the peeling operation, the wear resistant ceramic tracing shoe is kept in contact with the surface of the fruit and determines the depth of cut made by the peeling cutter during the peeling operation.

A primary object of the present invention is to provide a light weight, rugged peeling head which, with its reduced weight and moment of inertia, more closely follows the surface of the fruit and increases the yield of usable peeled fruit.

A further object of the invention is to provide a peeling head which is capable of following bumpy varieties of fruits such as red or gold delicious apples which have vertical ridges on their sides and points on their blossom ends.

Another object of the invention is to provide an improved guard assembly which incorporates a ceramic wear resistant tracing shoe mounted in a plastic guard body so that the ceramic tracing shoe contacts the fruit, but the rugged plastic body of the guard bears the point loads of the assembled peeling head.

Another object of the invention is to provide an improved chip breaker which more effectively severs the peel string by cutting through the peel string rather than ripping the peel string.

Another object of the invention is to provide a rugged peeling head which is capable of operating for extended periods of maintenance free use and which is also relatively inexpensive in design.

A further object of the invention is to provide a peeling head wherein no adjustment of the clearance between the guard and rotating cutter is necessary.

A further object of the invention is to provide a peeling head having a few number of component parts and which is essentially maintenance free.

Other objects and advantages of the invention will become apparent upon consideration of the preferred embodiment hereinafter described in connection with the accompanying drawings.

BRIEF DESCRIPTION OF THE DRAWINGS

FIG. 1 is a perspective view showing the peeling head of the present invention in the process of peeling an apple;

FIG. 2 is a section on the line 2—2 of FIG. 1;

FIG. 3 is a section on the line 3—3 of FIG. 2;

FIG. 4 is a sectional view of a portion of the apparatus shown in FIG. 1;

FIG. 5 is an end elevation on the line 5—5 of FIG. 4;

FIG. 6 is a sectional view on the line 6—6 of FIG. 4;

FIG. 7 is an end elevation on the line 7—7 of FIG. 4;

DETAILED DESCRIPTION OF THE DRAWINGS

Figure 9:
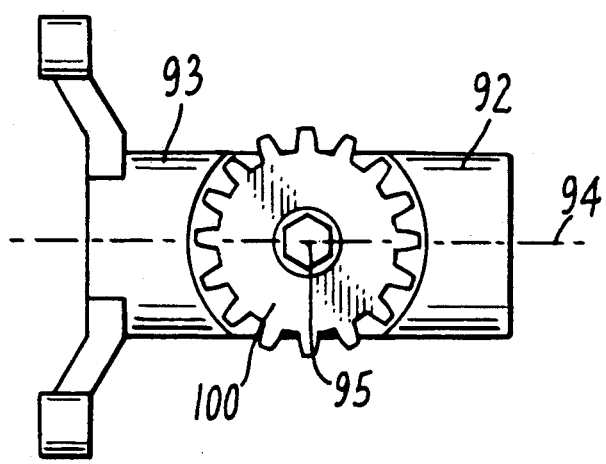
FIG. 9 is a plan view of the mechanism shown in FIG. 8.

As shown in FIG. 1, a fruit peeling mechanism shown generally as 20 is provided which utilizes a pair of rotary cutters 30 and 31 to peel fruit such as apple 10. Apple 10 is skewered on a vertical three prong arbor 11 and is rotated about a vertical axis in the direction of arrow 12 at approximately 200–400 rpm. Rotary peeling cutters 30 and 31 are pushed towards the center of apple 10 and are stopped when guard 40 (FIG. 4) contacts the skin of apple 10.

In those instances when the fruit is smooth and round, and when the axis of rotation is in the center of the fruit's geometric equator the rotary peeling cutter and guard have little radial movement to stay in proper contact with the surface of the fruit. However, the fruit is often far from ideal and is often impaled by arbor 11 at a significant angle. Furthermore, the core of the apple is often not in the center of the fruit mass and for some apples, such as red or gold delicious, the surface of the fruit has vertical ridges on the sides and "points" on the blossom end of the apples. Soft spots and coring bruises make peeling additionally difficult. Each defect in the fruit acts as a "pothole" which the rotary cutter and guard assembly must travel into and back out of as the fruit is rotated. The cutter end of the peeling head 20 is thus highly dynamic. It is therefore desirable to minimize the moment of inertia of the mechanism.

As shown in FIG. 1, the basic components of the peeling mechanism are shaft housings 70 and 71, guards 40 and 41 and rotary peeling cutters 30 and 31. Referring to FIGS. 4–7, the improved guard 40 is shown. As shown in FIG. 7, guard 40 comprises a plastic guard body 42 and a ceramic wear resistant tracing shoe insert 50.

The primary purpose of the guard 40 is to control the depth of the rotary peeling cutter 30 which in turn controls the yield and quality of the peeled fruit. The relationship of the guard 40 to the cutter 30 is the largest single influence on yield during peeling.

The ceramic tracing shoe 50 is made of the ceramic material injection molded zerconia. Zerconia is used because of its break, chip and wear resistance. Tracing shoe 50 may also be made of other ceramic material. The body portion 42 of the guard 40 is molded polyethelmide, which was chosen for its formability, low cost, high strength and rigidity but other plastic may be used. The ceramic tracing shoe 50 is mounted in the body portion 42 of guard 40 by being insert molded in place. The ceramic tracing shoe in this process is kept closely fit to the plastic mold and is oriented with the strong axis of the ceramic facing the pressure of the liquid plastic during injection. The thin axis has approximately equal area on both sides enclosed in the plastic. A fairly uniform flow must be maintained along both sides of the tracing shoe 50 during the molding process so that the ceramic shoe is pressure balanced during the process. The ceramic shoe stays in place in the finished part by mechanical binding through a hole or depression 51 formed in tracing shoe 50 through or into which plastic flows as shown in FIGS. 4 and 6. The ceramic wear resistant tracing shoe insert 50 is thus integrally formed in said plastic guard body by having the plastic guard body portion 42 injection molded around the ceramic tracing shoe in an injection molding process.

As shown in FIG. 5, the exposed, arcuate surface 52 of shoe 50 covers an arc of approximately 50 degrees. The contact edge 53 as shown in FIG. 4 is radiused to form an enlarged contact patch with the fruit being peeled. Referring to FIG. 5, ceramic tracing shoe 50 extends inwardly from radiused edge 53 less than one-half the radius of guard 40. This factor is significant in that the ceramic material used in the tracing shoe 50 is very expensive and is very vulnerable to point loading such as caused by the mechanical pinch of mounting or by the presence of uneven surfaces in the finished assembly. Furthermore, by minimizing the ceramic portion of the overall guard assembly 40, any shock loading during shipping or installation and use to the ceramic is minimized by the presence of the elastic qualities of the plastic material which support and carry the tracing shoe insert 50. The tracing shoe insert of the present invention thereby avoids the point loading induced failures to the ceramic guard of U.S. Pat. No. 4,430,932.

Another advantage of using the relatively small ceramic tracing shoe insert 50 is that the tolerances on the ceramic insert can be looser because the tolerances are controlled by the plastic which is more easily obtained. Tight tolerances in ceramics are very expensive as they are achieved only by diamond grinding.

By forming a radius 53 on the outer edge of ceramic tracing shoe 50, the contact patch with the apple 10 is increased, whereas the prior art device had a sharp corner which tended to bite into the skin causing peeling problems. The radius 53 also allows the overall radius of guard assembly 40 to be larger which increases yield on small apples.

The radius 53 also makes the clearance adjustment between the guard and cutter 30 less critical and therefore the clearance mechanism present in the device of U.S. Pat. No. 4,430,932 has been eliminated.

The plastic body portion 42 of guard 40 forms an arc of approximately 160 degrees as shown in FIG. 5 which contains a pair of angular gussets 43 and 44, which extend upwardly at an approximately 45 degree angle from the edge 53 of tracing shoe 50 radially inwardly. The purpose of gussets 43 and 44 is to strengthen the overall body portion 42 of guard 40 and also to help the guard 40 ride out of soft spots and other large defects in fruit being peeled.

As shown in FIG. 4, drive shaft 95 is a hollow shaft made of stainless steel. The distal end 96 of drive shaft 95 carries the cutter 30. Cutter 30 is mounted to drive shaft 95 by threaded bolt 97.

Drive shaft 95 also carries at its distal end 96, chip breaker shown generally as 60. The purpose of chip breaker 60 is to break the peel generated by the cutter. This peel is generally a long flat string 12-24 inches long. Long stringy peels are a problem in that they tend to build up in clumps and are difficult to remove from the machine. This can cause the machine to plug up. Furthermore, the stringy peels are difficult to deal with once they are out of the machine.

As shown in FIG. 2, chip breaker 60 spins with cutter 30. Chip breaker 60 has a pair of radially extending arms 61 and 62 which extend outwardly from drive shaft 95. The arms 61 and 62 are spring loaded against cutter 30 as shown best in FIG. 4. Arms 61 and 62 are spring loaded against cutter 30 adjacent the base of teeth 63 and 64.

Chip breaker 60 has an approximately 30 percent larger radius at the teeth 63 and 64 as compared to the chip breaker in U.S. Pat. No. 4,430,932. This additional radius gives the teeth 63 and 64 significant additional velocity which helps the teeth penetrate the peel. As shown in FIG. 2, tooth 63 has a positive rake angle relative to the travel of the peel string which allows the tooth 63 to travel edgewise through the peel further enhancing the cutting action and preventing the peel from stubbing into the outer face of the tooth. The positive rake angle also keeps the outside face of the tooth from being worn prematurely by the highly abrasive peel.

As shown in FIG. 3, tooth 64 has a positive attack angle whereby the tip of the tooth 63a engages the peel string before the base 64b of tooth 64. This positive attack angle tends to drive the peel string towards the base of tooth 64 as the peel string is being cut. The chip breaker of the present invention is more effective than the chip breaker of U.S. Pat. No. 4,430,932 in that the prior chip breaker tended to allow the peel string to deflect past the chip breaker initially and then snag the middle of the peel string and rip it off where it is being generated at the apple. The chip breaker according to the present invention is more positive. As shown in FIG. 3, the gap between the guard 40 and the tip of tooth 64a is kept less than 0.01 inch to help prevent the chip being missed by the breaker. Whereas the chip breaker of U.S. Pat. No. 4,430,932 would break the chip about once per revolution, the breaker of this invention usually breaks the chip twice per revolution.

The spring loading of the chip breaker 60 relative to the cutter 30 prevents apple peel from being wedged between the breaker and the cutter and tends to make the breaker teeth 63 and 64 much stiffer.

As shown in FIG. 4, shaft housing 70 holds the guard 40 as well as supporting drive shaft 95 and cutter 30 and chip breaker 60. Shaft housing 70 as shown in FIG. 1 is a tapered, thin walled plastic molding, having a smaller diameter at its distal end 72 than at its proximal end 73. The distal end 72 has a tapered surface 73 for receiving guard 40 by a taper press fit. The inner, generally cylindrical surface 49 of guard 40 is tapered to frictionally engage tapered surface 73 of shaft housing 70.

By using a tapered end and thin walled plastic shaft housing, the present design is stronger and lighter than those of the prior art and results in a lower moment of inertia which helps avoid chatter and skipping during peeling. Furthermore, the plastic shaft housing is more corrosion resistant that the prior art metallic designs. The weight reduction of the shaft housing is approximately 25 percent less than the shaft housing of U.S. Pat. No. 4,430,932 and the weight reduction is mostly at the distal or dynamic end and therefore contributes greatly to the low moment of inertia of the present design.

Figure 10:
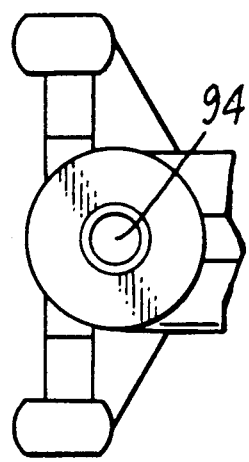
FIG. 10 is a side elevation of a portion of the mechanism shown in FIG. 9.
Figure 8:
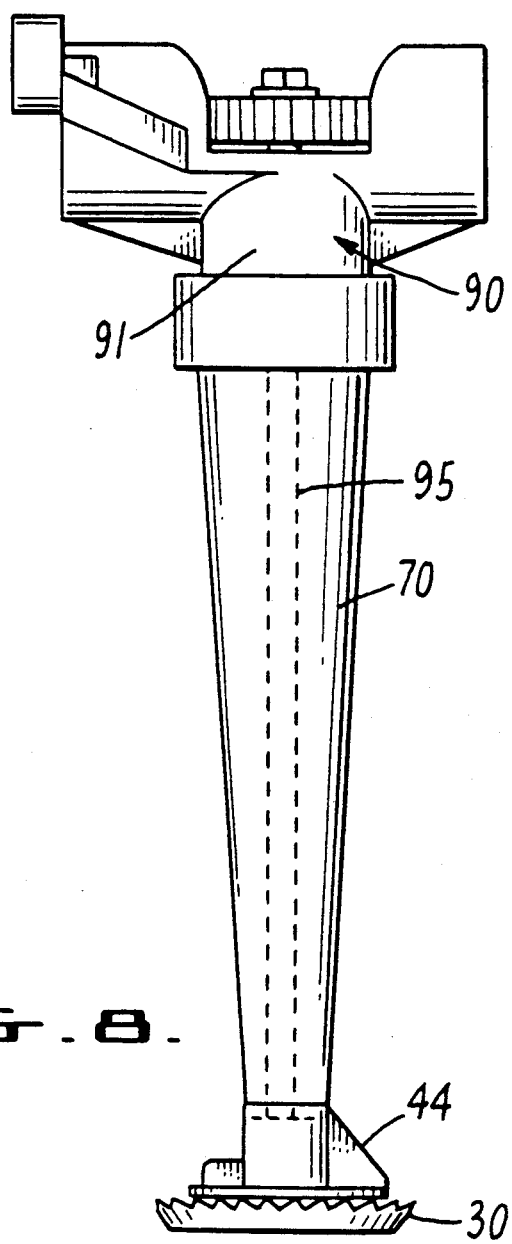
FIG. 8 is a side elevation of the peeling mechanism of the present invention.

Referring to FIGS. 8, 9 and 10, a yoke 90 is provided for carrying shaft housing 70, comprising a body portion 91 and a pair of arms 92 and 93. Arms 92 and 93 have a first passageway 94 formed therethrough, passageway 94 forming a pivot axis for the yoke 90 and shaft housing 70. The pivot axis is the axis about which the peeling mechanism rotates during the peeling process. The body portion 91 has a second passageway formed therein perpendicular to first passageway 94 for receiving drive shaft 95. A driven gear 100 is carried by drive shaft 95. The pivot axis 94 as shown in FIG. 9 runs through the rotational centerline of drive shaft 95 and driven gear 100. This mounting of driven gear 100 facilitates the reduction in size of yoke 90 which helps minimize the overall moment of inertia of the mechanism. The yoke 90 of the present invention is made of structural foam injection molded plastic as opposed to die cast aluminum used in prior art yokes.

What is claimed is:

1. In a fruit peeling mechanism which includes a shaft housing, a drive shaft rotatable within the housing and extending outwardly of the housing at the distal end thereof, a rotary peeling cutter mounted on the distal end of said drive shaft for rotation with the shaft, and a guard mounted on the shaft housing for cooperation with the cutter for determining the depth of a cut made by the cutter into a piece of fruit during a peeling operation, the improvement comprising:

the guard comprising a plastic guard body and a ceramic wear resistant tracing shoe insert which is integrally formed in said plastic guard body.

2. The mechanism of claim 1 wherein said ceramic tracing shoe is insert molded in place within said plastic guard body.

3. The mechanism of claim 1 wherein said tracing shoe has a radiused edge which forms an enlarged contact patch with the fruit being peeled.

4. The mechanism of claim 1 wherein said plastic guard body has at least one angled gusset extending from said tracing shoe to said shaft housing.

5. The mechanism of claim 1 wherein a peel string is continually generated by said cutter, and further comprising a chip breaker mounted on the distal end of said drive shaft, said chip breaker comprising at least one chip breaking tooth having a positive rake relative to the direction of travel of said peel string, and said tooth having a positive attack angle whereby said peel string is driven towards the base of said tooth as said peel string is being cut by said tooth.

6. The mechanism of claim 5 wherein said chip breaker comprises at least one radially extending arm extending outwardly from said drive shaft, said arm being spring loaded against said cutter adjacent the base of said tooth.

7. The mechanism of claim 1 wherein said shaft housing comprises a tapered, thin-walled plastic molding, with a smaller diameter at its distal end than at its proximal end.

8. The mechanism of claim 1 wherein said guard is mounted to said shaft housing by a taper press fit.

9. The mechanism of claim 8 wherein point loadings caused by both the mounting of said cutter to said drive shaft and the mounting of said guard to said shaft housing are borne by said shaft housing and said guard body rather than by said ceramic tracing shoe.

10. The mechanism of claim 1 further comprising a yoke for carrying said shaft housing and drive shaft, wherein said yoke comprises:

a body and at least one arm said arm having a first passageway formed therethrough, said passageway forming a pivot axis for said yoke and shaft housing, said body having a second passageway formed therein perpendicular to said pivot axis, said second passageway carrying said drive shaft, and a driven gear carried by said drive shaft, wherein said pivot axis runs through the rotational centerline of said drive shaft and said driven gear.

11. In an apple peeling machine wherein an apple is skewered and rotated about an axis and wherein at least one elongated pivotable shaft housing with a rotary peeling cutter mounted on its distal end articulates to move said rotary peeling cutter around the surface of said apple, the improvement comprising:

a thin-walled hollow plastic shaft housing having a proximal end and a distal end, said housing being tapered from a larger diameter at said proximal end to a smaller diameter at said distal end, a plastic guard carried at the distal end of said shaft housing, a ceramic tracing shoe insert carried by said plastic guard, a drive shaft carried by said shaft housing, and a rotary peeling cutter mounted on the distal end of said drive shaft, such that said ceramic tracing shoe follows the surface of the unpeeled apple and determines the depth of cut of said rotary peeling cutter.

12. In the mechanism of claim 11 wherein a peel string is continually generated, wherein the improvement further comprises a chip breaker mounted on the distal end of said drive shaft, said chip breaker comprising a pair of chip breaking teeth, each of said teeth being carried by an arm which extends radially from said drive shaft, each of said teeth having a positive rake angle relative to the direction of travel of said peel string, and each of said teeth having a positive attack angle whereby said peel string is driven toward the base of said tooth as it is being cut by said tooth.

13. The mechanism of claim 11 wherein said ceramic tracing shoe is mechanically bound to said plastic guard by having a hole formed in said ceramic tracing shoe and wherein said plastic guard is molded around said ceramic tracing shoe and during the molding process plastic flows through said hole and binds said ceramic tracing shoe to said guard.

* * * * *

UNITED STATES PATENT OFFICE
CERTIFICATE OF CORRECTION

Patent No. 5,027,699   Dated   July 2, 1991

Inventor(s) Douglas F. Paterson, et al.

It is certified that error appears in the above-identified patent and that said Letters Patent is hereby corrected as shown below:

col. 4, line 18, "63a" should be --- 64a --- col. 4, lines 44 and 47, "73" should be --- 75 ---

Signed and Sealed this

Thirtieth Day of November, 1993

Attest:

BRUCE LEHMAN

Attesting Officer

Commissioner of Patents and Trademarks